United States Patent [19]

Kobayashi et al.

[11] Patent Number: 4,920,013

[45] Date of Patent: Apr. 24, 1990

[54] MAGNETIC MULTILAYER STRUCTURE

[75] Inventors: Toshio Kobayashi, Tokyo; Shigekazu Otomo, Sayama; Ryoichi Nakatani, Akigawa; Noriyuki Kumasaka, Ome, all of Japan

[73] Assignee: Hitachi, Ltd., Tokyo, Japan

[21] Appl. No.: 100,231

[22] Filed: Sep. 23, 1987

[30] Foreign Application Priority Data

Sep. 24, 1986 [JP] Japan .................................. 61-223704

[51] Int. Cl.$^5$ ........................... B32B 9/00; G11B 5/66
[52] U.S. Cl. .................................... 428/694; 428/698; 428/900
[58] Field of Search ............... 428/694, 900, 698, 704; 360/126; 369/13

[56] References Cited

U.S. PATENT DOCUMENTS

| | | | |
|---|---|---|---|
| 3,516,076 | 6/1970 | Stein | 428/656 |
| 3,683,126 | 8/1972 | Krause | 360/126 |
| 4,052,749 | 10/1977 | Nomura et al. | 360/126 |
| 4,504,540 | 3/1985 | Kaminaka et al. | 428/698 |
| 4,516,180 | 5/1985 | Narishige et al. | 360/126 |
| 4,608,297 | 8/1986 | Shimada et al. | 428/215 |
| 4,610,935 | 9/1986 | Kumasaka et al. | 428/632 |
| 4,639,806 | 1/1987 | Kira et al. | 430/964 |
| 4,650,712 | 3/1987 | Hirose | 428/323 |
| 4,677,036 | 6/1987 | Nakamura et al. | 360/126 |
| 4,678,721 | 7/1987 | den Broeder et al. | 428/607 |
| 4,685,014 | 8/1987 | Hanazono et al. | 360/126 |
| 4,687,712 | 8/1987 | Sugata et al. | 428/611 |
| 4,703,383 | 10/1987 | Katsu et al. | 360/126 |
| 4,858,049 | 8/1989 | Kobayashi et al. | 360/126 |

FOREIGN PATENT DOCUMENTS

| | | |
|---|---|---|
| 114076 | 7/1984 | European Pat. Off. |
| 0174144 | 12/1986 | European Pat. Off. |
| 182938 | 10/1984 | Japan |
| 83218 | 5/1985 | Japan |
| 258717 | 12/1985 | Japan |
| 210607 | 9/1987 | Japan |

OTHER PUBLICATIONS

T. Shinjo, Survey on Metallic Superlattice Studies, Digest for Japan Society of Applied Magnetics, 43-1, 1986, pp. 1-8.

Maritato et al., "Ferromagnetic Multilayers of Permalloy and Tin", J. App. Psy. vol. 61, No. 4, Feb. 15, 1987, pp. 1588-1590.

Primary Examiner—George F. Lesmes
Assistant Examiner—Dennis V. Carmen
Attorney, Agent, or Firm—Antonelli, Terry & Wands

[57] ABSTRACT

A magnetic multilayer structure having an increased permeability and an increased saturation magnetic flux density comprises a plurality of magnetic layers and a plurality of intermediate layers alternately laminated one upon another. Each of the magnetic layers is made of Fe, Co, Ni or an alloy containing one of Fe, Co and Ni, while each of the intermediate layers is made of a material capable of interstitially forming a solid solution with the material of the magnetic layers.

9 Claims, 7 Drawing Sheets

MAGNETIC MULTILAYER STRUCTURE

BACKGROUND OF THE INVENTION

The present invention relates to a magnetic multilayer structure having both characteristics of a high saturation magnetic flux density and a high relative permeability. This magnetic multilayer structure is suitable for use in a magnetic pole of a magnetic head which exhibits excellent recording and reproducing characteristics to a high density magnetic recording medium with a high coercive force. However, this structure is not limited to this application.

Hitherto, a magnetic layer constituting a magnetic pole of a magnetic head for magnetic recording is made of an alloy containing Fe, Co or Ni as a main component and has a saturation magnetic flux density above 10 kG or a saturation magnetic flux density above 18 kG in the case of an Fe-Si system alloy and has been developed as a magnetic pole material of a magnetic head for high density recording (JP-A No. 59-182938). To obtain a magnetic field having a steep distribution for high density recording, it is necessary to set a thickness of the tip portion of the magnetic pole of the magnetic head or a thickness of the whole magnetic pole when it is measured in the moving direction of a recording medium to be 0.5 μm or less. Since the magnetic flux density in this portion is high, it is necessary to form this portion by a material having a high saturation magnetic flux density, a high permeability, and a low coercive force. Further, since a thickness of this portion is thin, magnetic saturation occurs. Therefore, in order to realize desired recording and reproducing characteristics of a head, a high saturation magnetic flux density above 15 kG is needed to use a thickness of layer not larger than 0.5 μm. On the other hand, to satisfy the recording and reproducing characteristics of the head irrespective of the above-mentioned thickness of layer, a high relative permeability above 1000 and a low coercive force below 1 Oe are needed.

Hitherto, a magnetic layer is formed by a high frequency sputtering method or the like. In the case of using a material containing Fe as a main component, the magnetic characteristic of the magnetic layer has a high saturation flux density above 15 kG. However, its relative permeability has a low value below 700. Therefore, the conventional magnetic layer is improper to form a magnetic head adapted to perform high density recording. Therefore, hitherto, it is extremely difficult to form a magnetic layer having both characteristics of a high saturation magnetic flux density and a high relative permeability.

SUMMARY OF THE INVENTION

The present inventors have learned that in the case of the multilayer structure of metal layers, by laminating two kinds of metal layers on the order of atomic layers, it is expected that a new material having a new characteristic different from the characteristics of the original metals is formed [for example, refer to Shinjo: "Digest for the Meeting of The Japan Society of Applied Magnetics", 43-1, (1986) pp. 1-8]. Therefore, the present inventors have examined using an ion beam sputtering method with respect to a magnetic multilayer structure consisting of an iron group element and another element. Thus, the invertors have found out that, for example, when a multilayer structure is formed by laminating Fe layers through other elements, multilayers are found to have a tendency such that the coercive force decreases. A cross section of this multilayer structure was observed using an electron microscope. Although it was very difficult to observe it, it has been confirmed that the crystal grain of the Fe layer was cut by the intermediate layer and changed from the columnar crystal to the fine crystal grain. Therefore, it is presumed that one for the reasons of the reduction of the coercive force in those multilayer structures is based on the finding that the crystal grain of Fe was made fine.

The present inventors also have studied the relative permeabilities and saturation magnetic flux densities of those multilayer structures. Thus, it has been confirmed that although there is a tendency such that the relative permeability increases with a decrease in coercive force, the saturation magnetic flux density does not always increase and almost all of the multilayer structures have a fairly lower saturation magnetic flux density than that of the single layer of Fe. Further, the present inventors have studied in detail, and have found that as a material of an intermediate layer which can increase the relative permeability without reducing the saturation magnetic flux density of the multilayer structure, it is possible to mention a material consisting of an iron group metal selected from the group of Fe, Co, Ni, and the like or an element selected from the group of B, N, C, P, S, etc. capable of interstitially forming a solid solution with an alloy containing iron group metal as a main component.

The reason why the magnetic multilayer structure using an intermediate layer consisting of an iron group metal or an element capable of interstitially forming a solid solution with an alloy containing the iron group metal increases the relative permeability without reducing the saturation flux density is unclear. However, it is presumed that those elements have the nature to make the crystal grain fine without diluting the magnetic moment per unit volume of the iron group metal or an alloy thereof.

It is an object of the present invention to provide a magnetic multilayer structure having a high saturation magnetic flux density and a high relative permeability. This magnetic multilayer structure is suitable to form a magnetic pole of a magnetic head (for example, for a perpendicular and longitudinal recording) having excellent recording and reproducing characteristics to a medium with a high coercive force for high density magnetic recording.

The present invention is made in consideration of the results of the above-mentioned studies and examinations. According to one aspect of the invention, magnetic layers each having a high saturation magnetic flux density made of a metal consisting of an iron group element which belongs to a group VIII in the periodic table which is represented by an element such as Fe, Co, Ni, or made of an alloy containing any one of the above-mentioned elements as a main component and intermediate layers each consisting of a single element selected from the group of, for example, B, C, N, P, S, etc. or of a compound (e.g., ZrC, $Fe_2B$, $TiB_2$, BN, BP, $B_4C$, SiC, $Si_3N_4$, TiC, TiN, $Ti_2N$, AlN) containing one or more of these elements capable of interstitially forming a solid solution with the metal or alloy consisting of the iron group element constituting the magnetic layer are laminated to provide a magnetic multilayer structure. A combination of the magnetic layer and the intermediate layer constitutes one period. A plurality of periods are formed by alternately laminating magnetic layers and intermediate layers. Thus, a magnetic multilayer structure as the magnetic film having, for example saturation magnetic flux density about 15 kG or higher, a relative permeability about 1000 or higher, and a coercive force about 1 Oe or lower is obtained.

In the magnetic multilayer structure according to an embodiment of the invention, the magnetic layer is made of a single metal consisting of Fe, Co or Ni having a high saturation magnetic flux density, an alloy containing at least one of these metals, an alloy containing as a main component the metal selected from the group of these metals and an element selected from the group of C, Si, B, N, Ti, etc., or the like. The intermediate layer which is laminated onto the magnetic layer is made of a single element selected from the group of, e.g., B, C, P, S, etc. capable of interstitially forming a solid solution with the metal or alloy constituting the magnetic layer or a compound containing at least one element selected from the group of B, C, N, P, etc. The sum of the thicknesses of the magnetic layer and intermediate layer thereon in the magnetic multilayer structure formed by laminating these layers is preferably within a range, e.g., from 0.2 nm to 250 nm. A thickness of intermediate layer is preferably within a range from 0.05 nm to 5 nm. It is also desirable that a thickness of intermediate layer is in a range from 1% to 25% of a thickness of one period in the magnetic multilayer structure.

A thickness of the magnetic multilayer structure formed by laminating a plurality periods each consisting of a magnetic layer and an intermediate layer largely differs in dependence on the specifications of the magnetic pole of a magnetic head or the like to be manufactured. The thickness of this magnetic pole largely changes to, e.g., about 100 nm to 50 μm.

A group IV element selected from the group of Ti, Zr, C, Si, Ge, Sn, etc. or an element such as C, N, B, or the like capable of interstitially forming a solid solution with the Fe, Ni or Co layer is contained as an additive into the alloy forming the magnetic layer, thereby enabling the permeability of the magnetic multilayer structure to be increased. A group VIII element selected from the group of Rh, Ru, Pd, Co, Ni, Os, Ir and Pt, Cu, Ag or Au is contained as an additive into the alloy forming the magnetic layer, thereby enabling the corrosion resistance of the magnetic multilayer structure to be improved. By containing Ti, Zr, Hf, V, Nb, Ta, Mo or W as an additive, the heat resistance of the magnetic multilayer structure can be improved.

The amount of the additive should be set such that the absolute value of the magnetostriction constant of the magnetic layer is substantially $1 \times 10^{-6}$ or lower. Due to this, a distortion which is caused in the manufacturing process of the magnetic multilayer structure and in the process to make a magnetic head using the magnetic multilayer structure, for example, a distortion which is caused by a formation or patterning of the layer is minimized, so that a deterioration of the magnetic characteristic of the head can be prevented. It is desirable that an amount of the additive does not generally exceed 10 atomic %.

The magnetic multilayer structure of the invention can constitute one or both of two magnetic layers which form a magnetic pole of a magnetic head for the high density longitudinal recording shown in, e.g., FIG. 7 or a magnetic layer forming the main magnetic pole of a magnetic head for the high density perpendicular magnetic recording shown in FIG. 8.

According to an embodiment, a magnetic layer made of a single metal of Fe, Co or Ni or an alloy containing as a main component the element selected from these elements is finely laminated through an intermediate layer containing an element capable of interstitially forming a solid solution with the foregoing metal or alloy, thereby forming a magnetic multilayer structure. This multilayer structure has a high saturation magnetic flux density about, e.g., 18 kG or higher and a high relative permeability about 1500 or higher. Therefore, when this multilayer structure is used as a magnetic layer constituting the main magnetic pole of a magnetic head for the magnetic recording, a strong magnetic field can be generated from the tip of the magnetic pole without causing a magnetic saturation even if a thickness of layer is made so thin as to be about 0.2 μm. A super high density magnetic recording can be accomplished.

DESCRIPTION OF THE PREFERRED EMBODIMENTS (Example 1)

Figure 2:
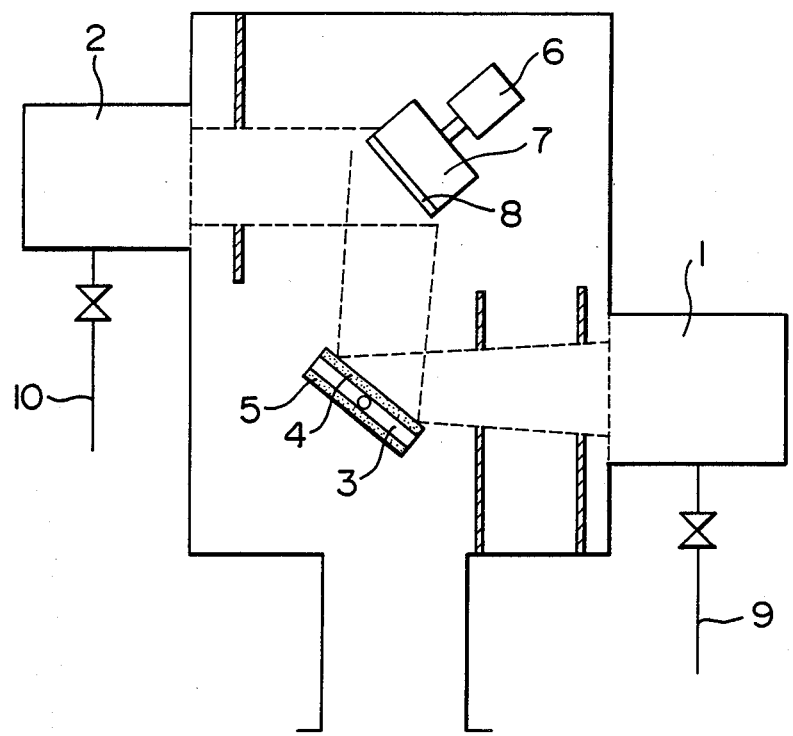
FIG. 2 is a diagrammatical view showing a structure of an ion beam sputtering apparatus for use in an embodiment of the invention.

A magnetic multilayer structure was formed by an ion beam sputtering method. As shown in FIG. 2, according to the ion beam sputtering method, accelerated ions emitted from a first ion gun 1 sputter a target material 4 set in a rotary target holder 3, thereby allowing sputtering particles to be deposited onto a base plate 8 attached onto a base plate holder 7. At this time, since the target holder 3 is rotated at every predetermined period of time, target materials 4 and 5 which are respectively fixed one by one onto the front and back surfaces of the target holder 3 are sputtered by the ions. Since the sputtering particles are alternately deposited onto the base plate 8, a thin layer is laminated. In this Example, a second ion gun 2 to irradiate ions onto the base plate holder 7 was also used. The second ion gun 2 can perform not only the cleaning of the base plate 8 just before the sputtering but also the ion irradiation onto the base plate 8 even during the sputtering operation by the first ion gun 1. By exciting the sputtering particles, the state of the layer to be deposited onto the base plate 8 can be controlled so as to optimize the magnetic characteristic of the magnetic multilayer structure.

The desirable ion beam sputtering conditions to form a multilayer structure having a high saturation magnetic flux density and a high relative permeability were as follows.

| | |
|---|---|
| Target front surface | Fe (purity 99.9%) |
| Target back surface | C (purity 99.99%) |
| Accelerating voltage of the first ion gun | 1200 V |
| Ion current density of the first ion gun | 1.2 mA/cm$^2$ |
| Accelerating voltage of the second ion gun | 200 V |
| Ion current density of the second ion gun | 0.15 mA/cm$^2$ |
| Ar pressure | 2.5 × 10$^{-2}$ Pa |
| Temperature of base plate | 75° C. |
| Rotational speed of base plate | 100 r.p.m. |

Figure 1:
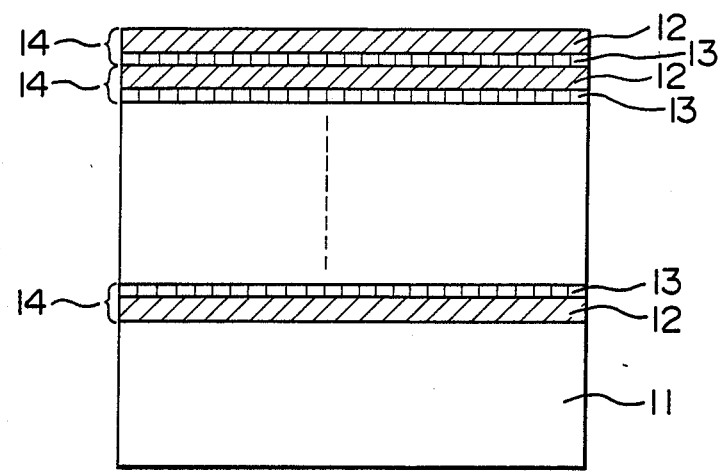
FIG. 1 is a diagrammatical view showing a cross sectional structure of a magnetic multilayer structure produced in the Example 1 according to the present invention.

The forming speeds of the Fe layer and C layer were respectively independently measured under the above conditions. The thickness of layer when forming a multilayer structure was controlled by the time. In this case, the layer forming speed of Fe was 0.22 nm/sec and that of C was 0.07 nm/sec. When forming a multilayer structure, first, the operation of the first ion gun was started and the presputtering processes of the Fe and C targets were performed with a shutter (not shown) closed. Next, the operation of the second ion gun was started. Thereafter, the shutter was opened and formation of a multilayer structure was started. In this Example, by rotating from the Fe target to the C target and from the C target to the Fe target each time a predetermined period of time has elapsed, a magnetic multilayer structure having a structure shown in FIG. 1 was formed. Namely, the magnetic multilayer structure is formed by laminating a plurality of periods on the base plate 11, wherein each period 14 consists of a combination of the magnetic layer 12 made of, e.g., Fe and the intermediate layer 13 made of, e.g., C.

Figure 3:
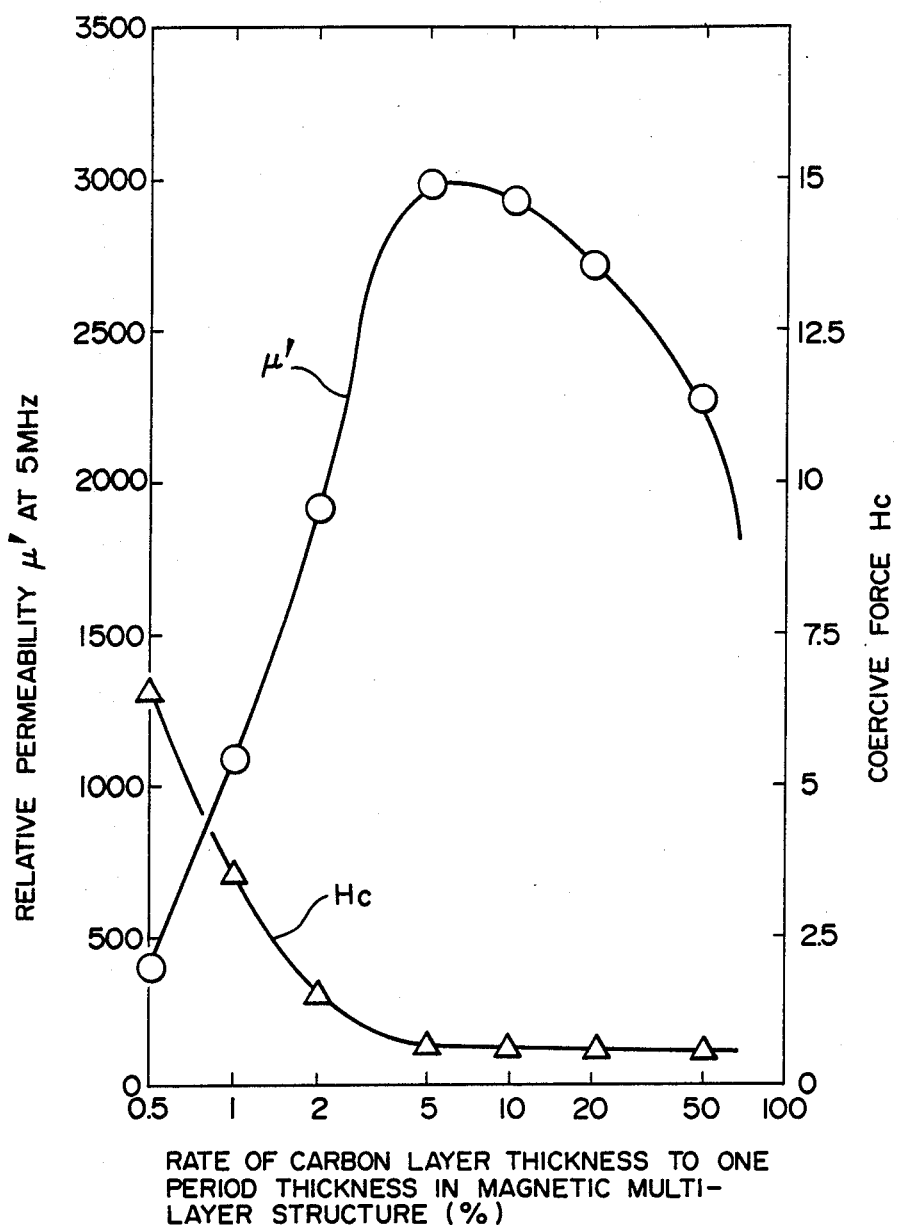
FIG. 3 is a graph showing an influence by the rate of a carbon layer thickness to one period thickness in a magnetic multilayer structure which exerts on the relative permeability and coercive force of the magnetic multilayer structure.
Figure 4:
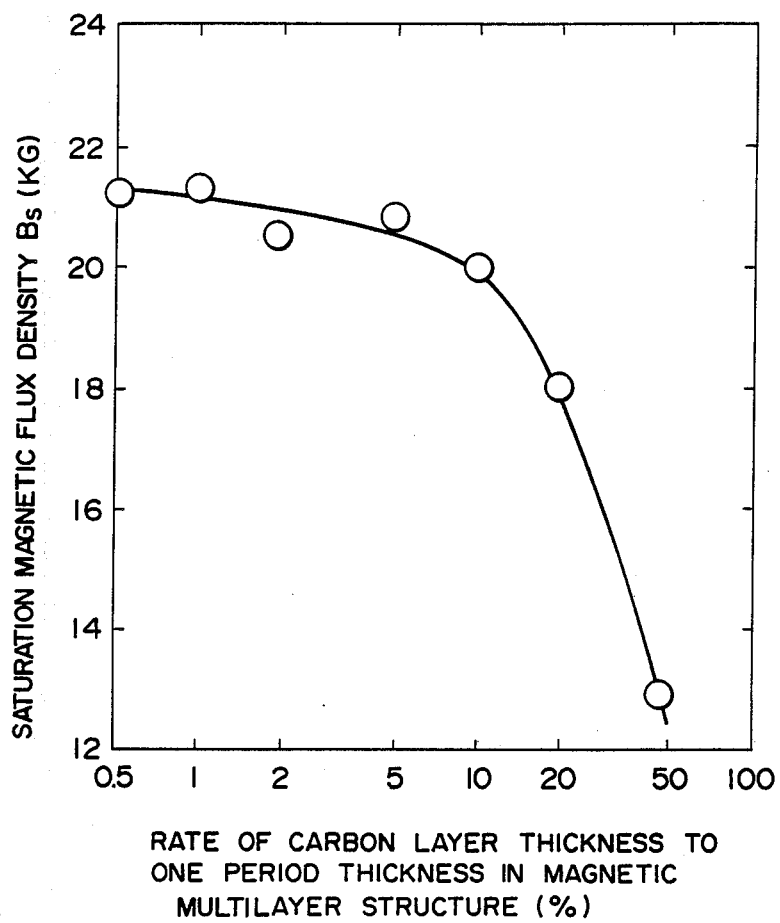
FIG. 4 is a graph showing an influence by the rate of a carbon layer thickness to one period thickness in a magnetic multilayer structure.

FIG. 3 shows a relative permeability $\mu'$ and a coercive force $H_c$ at 5 MHz of the resultant magnetic multilayer structure and FIG. 4 shows a saturation flux density $B_s$. As will be obvious from FIG. 3, the coercive force greatly decreased with an increase in rate of the single carbon layer thickness to the one period thickness. The relative permeability greatly increased with the reduction of the rate. Although there is a tendency such that the relative permeability decreases as the rate of the carbon layer thickness further increases, a change in coercive force did not occur. On the other hand, as will be obvious from FIG. 4, there is a tendency such that the saturation magnetic flux density gradually decreases with an increase of a single carbon layer thickness to one period thickness. However, a degree of the reduction of the saturation magnetic flux density is small until the rate of 25% of the carbon layer thickness to one period thickness. When this rate exceeds 25%, this reduction degree increases.

From the foregoing results, one of the reasons why the saturation magnetic flux density decreases and the relative permeability increases by increasing the rate of the carbon layer thickness is presumed as follows. Namely, the columnar crystal which is formed by a single iron layer is cut by interposing the thin carbon layer, thereby causing an effect similar to that the crystal grain diameter substantially decreases, so that the dispersion of the crystal line anisotropy was reduced. On the other hand, the reason why the saturation magnetic flux density decreases is because the rate of iron to the multilayer structure decreases due to the insertion of carbon as a nonmagnetic material, so that the magnetic moment is diluted. However, it is presumed that when the rate of the carbon layer thickness is small, a ferromagnetic Fe-C alloy is formed and the magnetic moment is not diluted.

Figure 5:
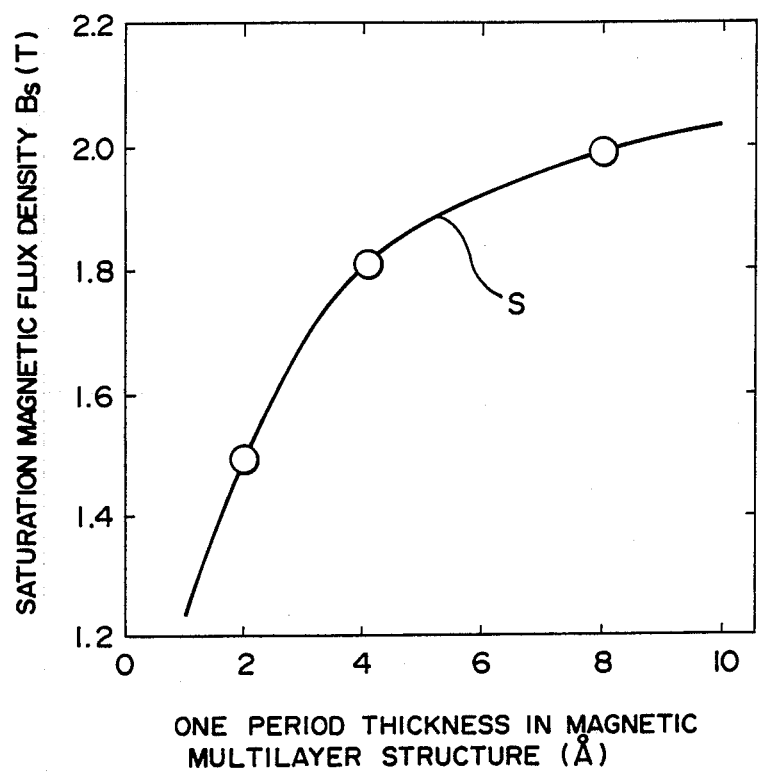
FIG. 5 is a graph showing the relation between the one period thickness in a magnetic multilayer structure and the saturation flux density of the magnetic multilayer structure.
Figure 6:
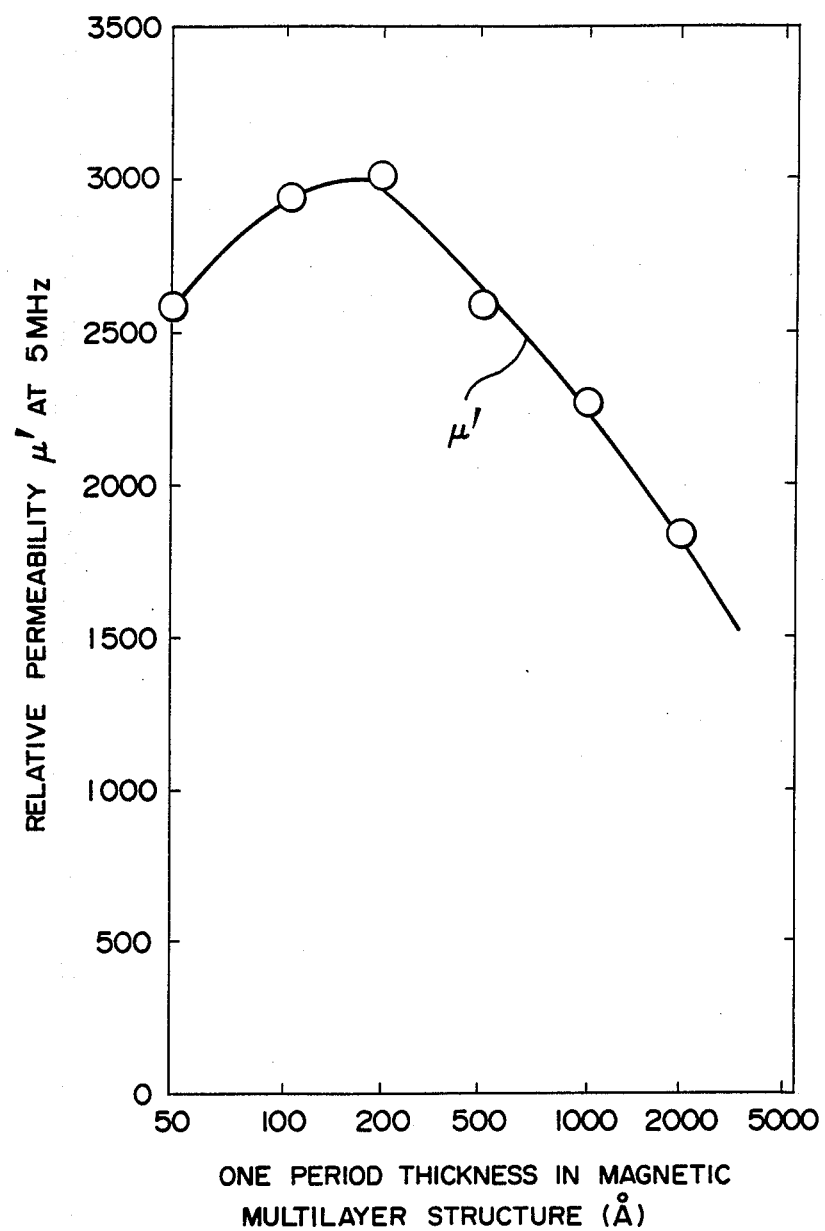
FIG. 6 is a graph showing the relation between the one period thickness in a magnetic multilayer structure and the relative permeability of the magnetic multilayer structure.
Figure 7:
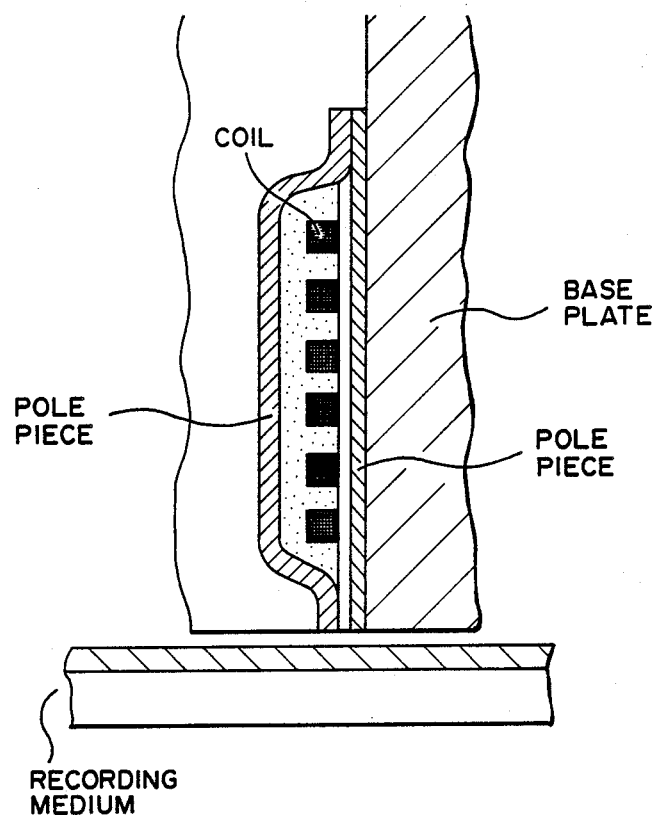
FIGS. 7 and 8 are diagrams showing examples of a magnetic head for longitudinal recording and a magnetic head for perpendicular recording.
Figure 8:
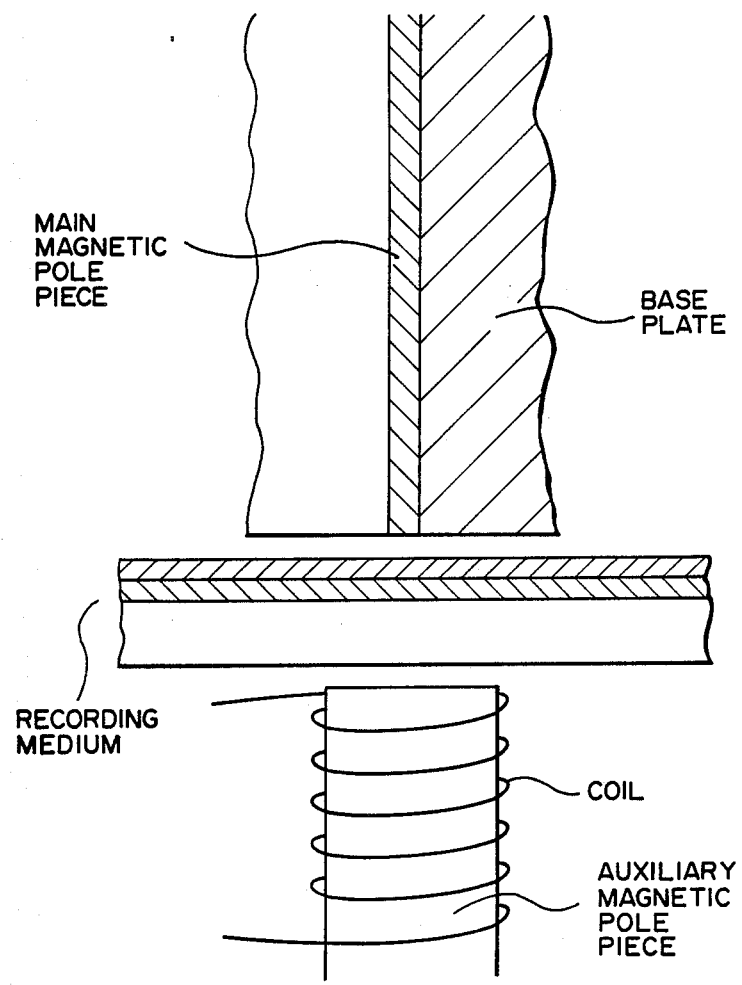

From the above results, the rate of the single carbon layer thickness having the characteristics which are necessary as a magnetic pole material of the magnetic head such that the relative permeability is above 1000 and the saturation flux density is above 18 kG is within a range from 1 to 25% of one period thickness. A more preferable rate of the single carbon layer thickness is in a range from 2 to 20%. However, as shown in FIGS. 5 and 6, when one period thickness as the sum of the thicknesses of the magnetic layer and intermediate layer forming the magnetic multilayer structure is less than 0.2 nm, the saturation magnetic flux density remarkably decreases. On the contrary, when one period thickness exceeds 50 nm, the relative permeability decreases. When one period thickness exceeds 250 nm, the relative permeability extremely decreases. Therefore, one period thickness is preferably set to be within a range from 0.2 nm to 250 nm, more preferably, in range from 0.2 nm to 50 nm. When the thickness of intermediate layer is less than 0.05 nm, the relative permeability remarkably decreases. When it exceeds 5 nm, the relative permeability again remarkably decreases. Thus, the thickness of intermediate layer is preferably set to be within a range from 0.05 nm to 5 nm.

The resultant magnetic multilayer structure consisting of the iron layer having a thickness of 4.8 nm and the carbon layer having a thickness of 0.2 nm was examined by an X-ray diffracting method with a result that a diffracting line was detected at the position corresponding to a lattice plane distance d=5.05 nm and the formation of the multilayer structure was confirmed. On the other hand, the resultant multilayer structure consisting of the iron layer having a thickness of 9.5 nm and the carbon layer having a thickness of 0.5 nm was analyzed by an Auger electronic spectrometer with a result that Auger electron intensities of iron and carbon alternately increased. Thus, the existence of the multilayer structure was also confirmed by the Auger electronic spectrometry.

(Example 2)

In the Example 1, a material of the magnetic layer, a material of the intermediate layer, and their thicknesses were changed as shown in Table 1 and the examinations were performed in a manner similar to the Example 1. Table 1 shows the saturation magnetic flux densities $B_s$ (kG) and the relative permeabilities $\mu'$ at 5 MHz of the magnetic multilayer structures obtained. As will be obvious from Table 1, all of the magnetic multilayer structures had saturation magnetic flux densities above 19 kG and the relative permeabilities above 1500.

TABLE 1

| | No. | Magnetic layer material | Thickness (nm) | Intermediate layer Material for Target | Thickness (nm) | One period (nm) | Saturation magnetic flux density Bs (kG) | Relative permeability $\mu'$ (5 MHz) |
|---|---|---|---|---|---|---|---|---|
| Examples | 1 | Fe | 9.5 | B | 0.5 | 10 | 20.6 | 2710 |
| | 2 | | 4.8 | | 0.2 | 5 | 20.8 | 2520 |
| | 3 | | 2.8 | | 0.2 | 3 | 19.7 | 2870 |
| | 4 | | 4.8 | BN | 0.2 | 5 | 21.6 | 2250 |
| | 5 | | 3.3 | | 0.2 | 3.5 | 20.5 | 1600 |
| | 6 | | 4.7 | BP | 0.3 | 5 | 19.4 | 2620 |
| | 7 | | 5.6 | $B_4C$ | 0.4 | 6 | 20.3 | 2080 |
| | 8 | | 2.7 | | 0.3 | 3 | 19.1 | 1960 |
| | 9 | | 5.7 | SiC | 0.3 | 6 | 19.6 | 2600 |
| | 10 | | 2.7 | | 0.3 | 3 | 19.8 | 2130 |
| | 11 | | 7.5 | $Si_3N_4$ | 0.5 | 8 | 21.2 | 2840 |
| | 12 | | 4.6 | | 0.4 | 5 | 19.4 | 1830 |
| | 13 | | 4.6 | TiC | 0.4 | 5 | 20.6 | 2560 |
| | 14 | | 4.8 | P | 0.2 | 5 | 20.7 | 2900 |
| | 15 | | 4.8 | S | 0.2 | 5 | 19.2 | 2340 |
| | 16 | Fe-5 at % C | 9.5 | B | 0.5 | 10 | 20.5 | 2220 |
| | 17 | Fe-5 at % Si | 9.5 | C | 0.5 | 10 | 19.6 | 2840 |
| | 18 | Fe-5 at % N | 9.5 | | 0.5 | 10 | 21.2 | 2770 |
| | 19 | Fe-5 at | 9.5 | BN | 0.5 | 10 | 19.4 | 2640 |
| | 20 | Fe-5 at % Ti | 9.5 | SiC | 0.5 | 10 | 19.3 | 2380 |
| Comparison Example | 1 | Fe single layer | 500 | — | — | — | 21.5 | 100 |

These results show that the material of the magnetic layer is not limited to single iron but may be a material containing iron as a main component and that the material of the intermediate layer may be an element such as B, C, N, P, S, or the like capable of interstitially forming a solid solution with Fe or a compound containing these elements capable of interstitially forming a solid solution. As the material of the intermediate layer in Table 1, the material of the target when performing the ion beam sputtering has been shown. The multilayer structure obtained does not indicate that the layer containing the compositions shown in Table 1 was formed.

The recording characteristic of the foregoing magnetic multilayer structure was examined in the case where this structure was used in the main magnetic pole of a magnetic head for the magnetic recording. Thus, it has been confirmed that the main magnetic pole of the magnetic head which can present the recording density above 100 kBPI (kilobits/inch) larger than the conventional magnetic recording density of 80 kBPI was obtained.

In the foregoing Examples, iron or iron alloy has been used as the magnetic layer. However, it has been confirmed that the effect similar to those in the foregoing Examples can be also obtained even in the case of copper or nickel as the iron group element or an alloy containing this iron group element as a main component and the foregoing additive.

We claim:

1. A magnetic multilayer structure having an increased permeability and an increased saturation magnetic flux density, the structure comprising a plurality of magnetic layers and a plurality of intermediate layers, each of said intermediate layers being formed between adjacent two of said magnetic layers, wherein
   each of said magnetic layers is crystalline and is made of a magnetic material selected from the group consisting of Fe, Co, Ni and an alloy containing as its main component at least one of said elements, Fe, Co and Ni, and
   each of said intermediate layers is made of a material which forms an interstitial solid solution with said material of said magnetic layers.

2. A magnetic multilayer structure according to claim 1, in which said alloy further contains an additive selected from the group consisting of C, Si, B, N and Ti.

3. A magnetic multilayer structure according to claim 1, in which said material of said intermediate layer is selected from the group consisting of B, C, S and a compound containing at least one of B, C, N, P and S.

4. A magnetic multilayer structure according to claim 1, in which the sum of the thicknesses of any one of said magnetic layers and of an intermediate layer thereon is substantially in a range from 0.2 nm to 250 nm, each of said intermediate layers has a thickness substantially in a range from 0.05 nm to 5 nm, and the ratio of the thickness of said each intermediate layer to that of said each magnetic layer is substantially in a range from 0.01 to 0.25.

5. A magnetic multilayer structure according to claim 1, in which the sum of the thicknesses of any one of said magnetic layers and of an intermediate layer thereon is substantially in a range from 0.2 nm to 50 nm while each of said intermediate layers has a thickness substantially in a range from 0.05 nm to 5 nm, and the ratio of the thickness of said each intermediate layer to that of said each magnetic layer is substantially in a range from 0.01 to 0.25.

6. A magnetic multilayer structure according to claim 1, in which said alloy further contains an additive selected from the group consisting of a group IV element, N and B.

7. A magnetic multilayer structure according to claim 1, in which said alloy further contains an additive selected from the group consisting of a group VIII element, Cu, Ag or Au.

8. A magnetic multilayer structure according to claim 1, in which said alloy further contains an additive selected from the group consisting of Ti, Zr, Hf, V, Nb, Ta, Mo and W.

9. A magnetic head having a magnetic pole portion, at least a part of said magnetic pole portion being made of a magnetic multilayer structure defined in claim 1.

* * * * *